US012607612B2

(12) United States Patent
Kunisawa et al.

(10) Patent No.: US 12,607,612 B2
(45) Date of Patent: Apr. 21, 2026

(54) QUANTITATIVE DETERMINATION METHOD FOR REACTIVE SULFUR

(71) Applicants:SHIMADZU CORPORATION, Kyoto (JP); Shimadzu Techno-Research, Inc., Kyoto (JP)

(72) Inventors: Akihiro Kunisawa, Kyoto (JP); Atsuhiko Toyama, Kyoto (JP); Takaaki Akaike, Sendai (JP); Tsubasa Ibushi, Kyoto (JP)

(73) Assignees: SHIMADZU CORPORATION, Kyoto (JP); Shimadzu Techno-Research, Inc., Kyoto (JP)

( * ) Notice: Subject to any disclaimer, the term of this patent is extended or adjusted under 35 U.S.C. 154(b) by 503 days.

(21) Appl. No.: 18/230,494

(22) Filed: Aug. 4, 2023

(65) Prior Publication Data

US 2024/0053306 A1 Feb. 15, 2024

(30) Foreign Application Priority Data

Aug. 10, 2022 (JP) ................................. 2022-128154
Dec. 27, 2022 (JP) ................................. 2022-209942

(51) Int. Cl.
*G01N 30/72* (2006.01)
*G01N 30/02* (2006.01)

(52) U.S. Cl.
CPC ... *G01N 30/7233* (2013.01); *G01N 2030/027* (2013.01)

(58) Field of Classification Search
CPC ..... G01N 2030/027; G01N 2030/8859; G01N 30/7233; G01N 30/88
See application file for complete search history.

(56) References Cited

FOREIGN PATENT DOCUMENTS

WO WO-2018207879 A1 * 11/2018 ........... G01N 27/623

OTHER PUBLICATIONS

WO 2018207879 translation (Year: 2018).*

(Continued)

*Primary Examiner* — Jennifer Wecker
(74) *Attorney, Agent, or Firm* — Paratus Law Group, PLLC

(57) ABSTRACT

Provided is a quantitative determination method for sulfur compounds in a target group selected from a plurality of groups, e.g., a group including cysteine and related reactive sulfurs, including the steps of: performing an LC/MS/MS measurement of a standard substance having a known concentration of a base compound, e.g., cysteine, in the target group; acquiring quantitative reference information used for quantitative determination of the base compound and other reactive sulfurs, based on the measurement result, assuming that the signal intensities of sulfur compounds in the same group show a predetermined relationship when their concentrations are equal; performing an LC/MS/MS measurement for each sulfur compound in a specimen, under an analysis condition determined beforehand so that the signal intensities of sulfur compounds in the same group show the predetermined relationship when their concentrations are equal; and determining the quantity of each sulfur compound, using the measurement result and quantitative reference information.

7 Claims, 9 Drawing Sheets

(56)          References Cited

OTHER PUBLICATIONS

Ida et al., Reactive cysteine persulfides and S-polythiolation regulate oxidative stress and redox signaling, Proc. Natl. Acad. Sci., May 27, 2014, pp. 7606-7611, vol. 111, No. 21.
Ihara et al., New Developments in Active Sulfur Research, Journal of Japanese Biochemical Society, 2019, pp. 388-398, vol. 91, Issue 3.

* cited by examiner

Fig. 2

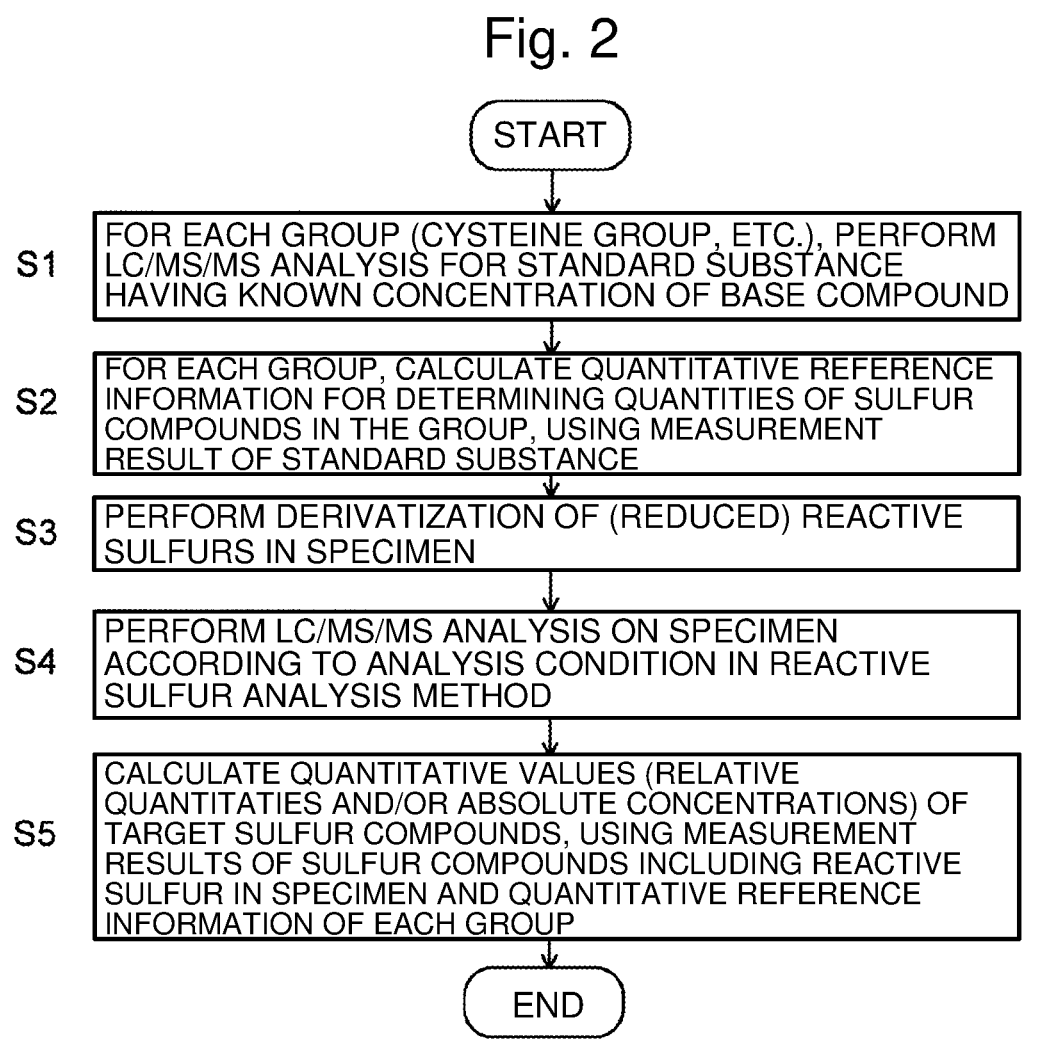

START

S1    FOR EACH GROUP (CYSTEINE GROUP, ETC.), PERFORM
      LC/MS/MS ANALYSIS FOR STANDARD SUBSTANCE
      HAVING KNOWN CONCENTRATION OF BASE COMPOUND

S2    FOR EACH GROUP, CALCULATE QUANTITATIVE REFERENCE
      INFORMATION FOR DETERMINING QUANTITIES OF SULFUR
      COMPOUNDS IN THE GROUP, USING MEASUREMENT
      RESULT OF STANDARD SUBSTANCE

S3    PERFORM DERIVATIZATION OF (REDUCED) REACTIVE
      SULFURS IN SPECIMEN

S4    PERFORM LC/MS/MS ANALYSIS ON SPECIMEN
      ACCORDING TO ANALYSIS CONDITION IN REACTIVE
      SULFUR ANALYSIS METHOD

S5    CALCULATE QUANTITATIVE VALUES (RELATIVE
      QUANTITATIES AND/OR ABSOLUTE CONCENTRATIONS) OF
      TARGET SULFUR COMPOUNDS, USING MEASUREMENT
      RESULTS OF SULFUR COMPOUNDS INCLUDING REACTIVE
      SULFUR IN SPECIMEN AND QUANTITATIVE REFERENCE
      INFORMATION OF EACH GROUP

END

Fig. 3

| FORMAL NAME | ABBREVIATED NAME | |
|---|---|---|
| ★Cysteine | CysSH | CYSTEINE GROUP |
| Cysteine hydrodisulfide | CysSSH | |
| Cysteine hydrotrisulfide | CysSSSH | |
| ★Cystine | CysSSCys | CYSTINE GROUP |
| Cystine trisulfide | CysSSSCys | |
| Cystine tetrasulfide | CysSSSSCys | |
| ★Glutathione | GSH | REDUCED GLUTATHIONE GROUP |
| Glutathione hydrodisulfide | GSSH | |
| Glutathione hydrotrisulfide | GSSSH | |
| ★Glutathione disulfide | GSSG | OXIDIZED GLUTATHIONE GROUP |
| Glutathione trisulfide | GSSSG | |
| Glutathione tetrasulfide | GSSSSG | |
| ★Sulfite | HSO$_3^-$ | SULFURIC ACID GROUP |
| ★Thiosulfite | HS$_2$O$_3^-$ | |
| Reaction By-product_1 | Bis-S-HPE-AM | SIDE-REACTION-PRODUCT GROUP |
| Reaction By-product_2 | Bis-SS-HPE-AM | |
| Reaction By-product_3 | Bis-SSS-HPE-AM | |

| NAME | INTENSITY BEFORE TUNING | |
|---|---|---|
| CysSSCys | 6,290,108 | 100% |
| CysSSSCys | 1,801,887 | 29% |
| CysSSSSSCys | 694,064 | 11% |
| GSSG | 6,344,908 | 100% |
| GSSSG | 5,164,441 | 81% |
| GSSSSG | 2,510,918 | 40% |
| CysS-HPE | 9,427,900 | 100% |
| CysSS-HPE | 12,102,267 | 128% |
| CysSSS-HPE | 4,088,003 | 43% |
| GS-HPE | 11,697,744 | 100% |
| GSS-HPE | 17,218,498 | 147% |
| GSSS-HPE | 7,185,908 | 61% |
| Bis-S-HPE | 7,937,224 | 100% |
| Bis-SS-HPE | 7,428,758 | 94% |
| Bis-SSS-HPE | 4,970,332 | 63% |
| HSO3-HPE | 8,508,250 | 25% |
| HS2O3-HPE | 33,971,482 | 100% |

Fig. 6B

| COMPOUND NAME | INTENSITY AFTER TUNING | RATIO TO INTENSITY BEFORE TUNING |
|---|---|---|
| CysSSCys | 1,245,284 | 20% |
| CysSSSCys | 1,215,242 | 19% |
| CysSSSSSCys_Custom-Custom | 1,369,854 | 22% |
| GSSG | 2,053,174 | 32% |
| GSSSG | 2,048,092 | 32% |
| GSSSSG | 2,262,548 | 36% |
| CysS-HPE | 3,809,561 | 40% |
| CysSS-HPE | 3,814,670 | 40% |
| CysSSS-HPE | 3,960,454 | 42% |
| GS-HPE | 7,043,493 | 60% |
| GSS-HPE | 7,095,729 | 61% |
| GSSS-HPE | 6,891,098 | 59% |
| Bis-S-HPE | 4,692,799 | 59% |
| Bis-SS-HPE | 4,370,353 | 55% |
| Bis-SSS-HPE | 4,413,808 | 56% |
| HSO3-HPE_Unit-Low | 14,534,524 | 43% |
| HS2O3-HPE | 15,188,725 | 45% |

Fig. 7A     BEFORE PARAMETER TUNING
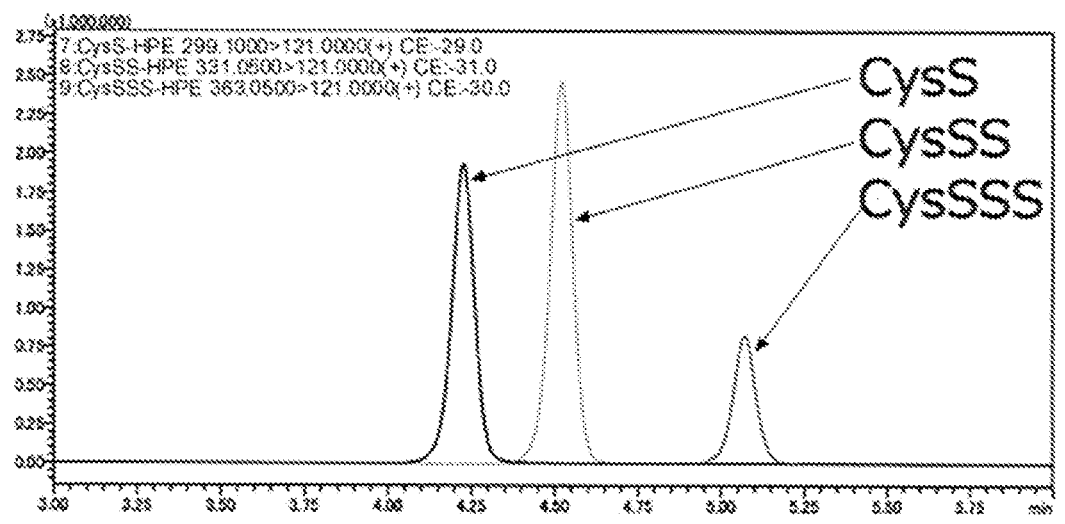
Fig. 7B     AFTER PARAMETER TUNING
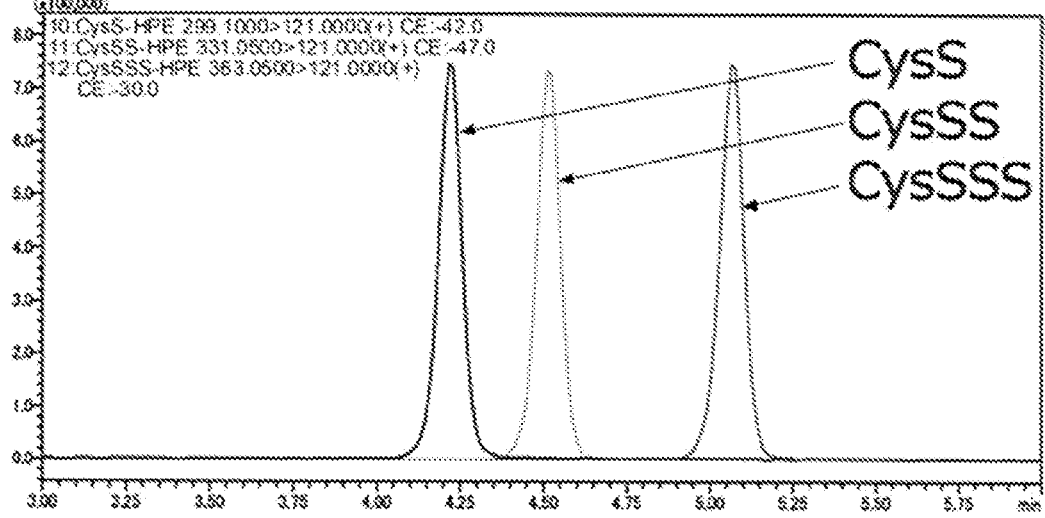

Fig. 8   <EVALUATION USING REAL SAMPLE>

| Plasma PFPP (2022/04/27) INTENSITY TUNING METHOD | | | | |
| COMPONENT NAME | PO-LAR-ITY | MRM TRANSITION | INJECTION OF SAMPLE EQUIVALENT TO 0.1uL OF PLASMA | INJECTION OF SAMPLE EQUIVALENT TO 0.01uL OF PLASMA |
| --- | --- | --- | --- | --- |
| CysSSCys | + | 241.00>152.00 | 56.1% | 93.0% |
| CysSSSCys | + | 273.00>122.00 | 42.8% | 91.1% |
| CysSSSSCys | + | 305.00>153.00 | 110.9% | 118.3% |
| CysS-HPE | + | 299.10>121.00 | 108.1% | 109.5% |
| CysSS-HPE | + | 331.05>121.00 | 95.7% | 106.7% |
| CysSSS-HPE | + | 363.05>121.00 | 107.4% | 113.6% |
| GSSG | + | 307.10>130.00 | 18.7% | 94.0% |
| GSSSG | + | 323.10>130.00 | 81.3% | 117.2% |
| GSSSSG | + | 339.10>210.00 | 118.9% | 124.0% |
| GS-HPE | + | 485.15>356.00 | 110.5% | 114.3% |
| GSS-HPE | + | 517.10>388.00 | 100.7% | 107.7% |
| GSSS-HPE | + | 549.10>420.00 | 106.1% | 110.7% |
| Bis-S-HPE | + | 389.15>224.00 | 123.4% | 121.5% |
| Bis-SS-HPE | + | 421.15>212.00 | 117.2% | 125.3% |
| Bis-SSS-HPE | + | 453.15>121.00 | 125.1% | 119.7% |
| HSO3-HPE | - | 258.05>121.00 | 71.2% | 110.8% |
| HS2O3-HPE | - | 290.05>208.00 | 101.9% | 102.3% |

Fig. 9   <EVALUATION USING REAL SAMPLE>

| Cell PFPP (2022/04/27) | | | INTENSITY TUNING METHOD | |
|---|---|---|---|---|
| COMPONENT NAME | PO-LAR-ITY | MRM TRANSITION | INJECTION OF 2uL OF 15-FOLD DILUTED CELLS | INJECTION OF 2uL OF 150-FOLD DILUTED CELLS |
| CysSSCys | + | 241.00>152.00 | 106.3% | 98.8% |
| CysSSSCys | + | 273.00>122.00 | 81.3% | 102.0% |
| CysSSSSSCys | + | 305.00>153.00 | 113.8% | 109.6% |
| CysS-HPE | + | 299.10>121.00 | 92.4% | 100.9% |
| CysSS-HPE | + | 331.05>121.00 | 92.0% | 92.9% |
| CysSSS-HPE | + | 363.05>121.00 | 101.6% | 101.1% |
| GSSG | + | 307.10>84.00 | 70.0% | 94.9% |
| GSSSG | + | 323.10>130.00 | 106.3% | 104.2% |
| GSSSSG | + | 339.10>210.00 | 102.3% | 99.5% |
| GS-HPE | + | 485.15>356.00 | 172.1% | 142.6% |
| GSS-HPE | + | 517.10>388.00 | 92.1% | 92.4% |
| GSSS-HPE | + | 549.10>420.00 | 95.7% | 98.4% |
| Bis-S-HPE | + | 389.15>224.00 | 105.5% | 96.3% |
| Bis-SS-HPE | + | 421.15>212.00 | 104.8% | 102.5% |
| Bis-SSS-HPE | + | 453.15>121.00 | 102.6% | 97.4% |
| HSO3-HPE | - | 258.05>121.00 | 89.7% | 96.3% |
| HS2O3-HPE | - | 290.05>208.00 | 96.0% | 94.6% |

QUANTITATIVE DETERMINATION METHOD FOR REACTIVE SULFUR

CROSS REFERENCE TO PRIOR APPLICATION

This application claims priority to Japanese Patent Application Nos. 2022-128154 (filed on Aug. 10, 2022) and 2022-209942 (filed on Dec. 27, 2022), which are all hereby incorporated by reference in their entirety.

TECHNICAL FIELD

The present invention relates to a method for determining the quantity of a sulfur compound including a molecular species of a reactive sulfur (which is hereinafter simply called a "reactive sulfur") in a specimen, and more specifically, to a method for quantitative determination employing chromatograph-mass spectrometry.

BACKGROUND ART

Reactive sulfur is a general term for highly reactive sulfur compounds, represented by cysteine persulfide which consists of cysteine having a thiol group (SH) to which sulfur atoms (normally two or more) are excessively added. Reactive sulfur, which is abundantly present in various organs and blood in living organisms, is known to function as a primary antioxidant capable of cancelling the effect of active oxygen in living organisms. Accordingly, reactive sulfur has been expected to be applied in various medical-related areas, including the human anti-aging, diagnosis of cancer and various other types of disease in which oxidant stress is involved, as well as development of preventive or treatment agents for those types of disease.

From these circumstances, there has been a request for an established technique for the quantitative determination of a reactive sulfur in a living organism. However, reactive sulfurs, or particularly, reduced reactive sulfurs are highly reactive compounds, so that they are easily decomposed during a pretreatment or analysis, making it difficult to accurately determine their quantities.

A commonly known example of a quantitative determination method for a sulfur compound including a reduced reactive sulfur is a method which uses a liquid chromatograph-tandem mass spectrometer (LC-MS/MS), as described in Non Patent Literature 1 or 2 or other related documents. In this method, a reduced reactive sulfur is converted into a stable derivative by means of an electrophilic alkylating agent, and a multiple reaction monitoring (MRM) measurement is performed by an LC-MS/MS to selectively detect the reactive sulfur.

CITATION LIST

Non Patent Literature

Non Patent Literature 1: Tomoko Ida and 15 other authors, "Reactive cysteine persulfides and S-polythiolation regulate oxidative stress and redox signaling", Proc. Natl. Acad. Sci. USA, May 27, 2014, Vol. 111, No. 21, pp. 7606-7611

Non Patent Literature 2: Hideshi Ihara and two other authors, "Recent advance in reactive sulfur research". Journal of Japanese Biochemical Society 91(3): 388-398 (2019)

SUMMARY OF INVENTION

Technical Problem

A quantitative determination performed in the previously described manner normally requires a standard sample containing a target component at a known concentration. However, no standard substance is commonly offered for reactive sulfurs which are chemically unstable, such as cysteine persulfide. Therefore, it is practically difficult for ordinary users to perform a quantitative analysis for a reactive sulfur by the previously described type of method.

The present invention has been developed to solve this problem. Its primary objective is to provide a quantitative determination method by which the quantities of various sulfur compounds including reactive sulfurs which are chemically unstable can be conveniently determined with a satisfactory level of accuracy, using a standard substance which is generally and readily available.

Solution to Problem

The first mode of the quantitative determination method for a reactive sulfur according to the present invention developed for solving the previously described problem is a method for determining the quantity of a sulfur compound including a reactive sulfur in a specimen by means of a chromatograph mass spectrometer, where the sulfur compound is included in at least one group as an analysis target selected from groups comprised of a group including cystine and reactive sulfurs related to cystine, a group including cysteine and reactive sulfurs related to cysteine, a group including oxidized glutathione and reactive sulfurs related to oxidized glutathione, and a group including reduced glutathione and reactive sulfurs related to reduced glutathione, the method including:

a standard substance measurement step for performing a measurement by a chromatograph mass spectrometer, for a standard substance having a known concentration of a base compound which is cystine, cysteine, oxidized glutathione or reduced glutathione included in the group as the analysis target;

a quantitative reference information acquisition step for acquiring quantitative reference information used for determining the quantities of the base compound and other reactive sulfurs included in the group as the analysis target, based on a measurement result obtained by the standard substance measurement step, on the assumption that signal intensities of a plurality of sulfur compounds included in the same group show a predetermined relationship when the concentrations of the plurality of sulfur compounds are equal;

a specimen measurement step for performing a measurement of a specimen by a chromatograph mass spectrometer for each sulfur compound included in the group as the analysis target, where the measurement is performed under an analysis condition determined beforehand for each sulfur compound so that signal intensities of a plurality of sulfur compounds included in the same group show the predetermined relationship when the concentrations of the plurality of sulfur compounds are equal; and a quantitative determination step for determining the quantity of each sulfur compound included in the group as the analysis target, using a measurement result obtained by the specimen measurement step and the quantitative reference information.

The second mode of the quantitative determination method for a reactive sulfur according to the present invention is a method for determining the quantities of a plurality of sulfur compounds each of which includes a reactive sulfur in a specimen by means of a chromatograph mass spectrometer, where the plurality of sulfur compounds are included in at least one group as an analysis target selected from groups comprised of a group including cystine and reactive sulfurs related to cystine, a group including cysteine and reactive sulfurs related to cysteine, a group including oxidized glutathione and reactive sulfurs related to oxidized glutathione, a group including reduced glutathione and reactive sulfurs related to reduced glutathione, a group including sulfuric acid and inorganic sulfur compounds related to sulfuric acid, and a group including side-reaction products generated from sulfuric compounds by a derivatization treatment for stabilizing a reactive sulfur, the method including:

a pretreatment step for performing, on a specimen, the derivatization treatment for stabilizing a reactive sulfur by using a predetermined derivatization reagent;

a specimen measurement step for performing a measurement of a specimen by a chromatograph mass spectrometer for each sulfur compound included in the group as the analysis target after the pretreatment of the specimen by the pretreatment step, where the measurement is performed under an analysis condition determined beforehand for each sulfur compound so that signal intensities of a plurality of sulfur compounds included in the same group show a predetermined relationship when the concentrations of the plurality of sulfur compounds are equal; and a quantitative determination step for performing relative quantitative determination of the plurality of sulfur compounds included in the group as the analysis target, based on a measurement result obtained by the specimen measurement step.

The third mode of the quantitative determination method for a reactive sulfur according to the present invention is a method for determining the quantity of a sulfur compound including a reactive sulfur in a specimen by means of a chromatograph mass spectrometer, the method including:

a standard substance measurement step for performing a measurement by a chromatograph mass spectrometer, for a standard substance having a known concentration of a sulfur compound included in a plurality of sulfur compounds forming one group which includes a target sulfur compound whose quantity is to be determined, where the plurality of sulfur compounds forming one group are identical in structure except for a chain combination of sulfur atoms and are different in the number of sulfur atoms forming the chain combination, and where the number of sulfur atoms forming the chain combination in the sulfur compound concerned is one or the smallest number in the group;

a quantitative reference information acquisition step for acquiring quantitative reference information used for determining the quantities of the sulfur compounds included in the same group, based on a measurement result obtained by the standard substance measurement step, on the assumption that signal intensities of a plurality of sulfur compounds included in the same group show a predetermined relationship when the concentrations of the plurality of sulfur compounds are equal;

a specimen measurement step for performing a measurement for the target sulfur compound in a specimen by a chromatograph mass spectrometer, where the measurement is performed under an analysis condition determined beforehand for each sulfur compound so that signal intensities of a plurality of sulfur compounds included in the same group show the predetermined relationship when the concentrations of the plurality of sulfur compounds are equal; and a quantitative determination step for determining the quantity of the target sulfur compound, using a measurement result obtained by the specimen measurement step and the quantitative reference information.

Advantageous Effects of Invention

By the first and third modes of the quantitative determination method for a reactive sulfur according to the present invention, the quantitative determination of various sulfur compounds including a reactive sulfur which is chemically so unstable that a standard substance is difficult to obtain can be conveniently performed with a sufficient level of accuracy by using a standard substance of a chemically stable sulfur compound which is generally and readily available.

According to the second mode of the quantitative determination method for a reactive sulfur according to the present invention, even in the case where there is a considerable variation in concentration among a plurality of sulfur compounds included in the same group inclusive of unstable reactive sulfurs, the relative quantities of those sulfur compounds can be accurately determined without using a standard substance of a sulfur compound.

BRIEF DESCRIPTION OF DRAWINGS

FIG. 2 is a flowchart showing a schematic procedure for performing a quantitative analysis of sulfur compounds including reactive sulfurs, using the analyzing system shown in FIG. 1.

FIG. 3 shows a list of 17 sulfur compounds as analysis targets in a sulfur compound analysis method.

FIG. 4 shows an example of the derivatization for stabilizing a reactive sulfur.

FIGS. 6A and 6B show an example of the comparison of the signal intensities of the sulfur compounds before the tuning of the MS analysis condition and those after the tuning.

FIGS. 7A and 7B show an example of the chromatograms of cysteine and cysteine persulfides before and after the tuning of the MS analysis condition.

FIG. 8 shows one example of the comparison of relative signal intensities of sulfur compounds obtained by using a real sample (a sample of blood plasma) under the tuned MS analysis condition.

FIG. 9 shows one example of the comparison of relative signal intensities of sulfur compounds obtained by using a real sample (a cell sample) under the tuned MS analysis condition.

DESCRIPTION OF EMBODIMENTS

Figure 1:
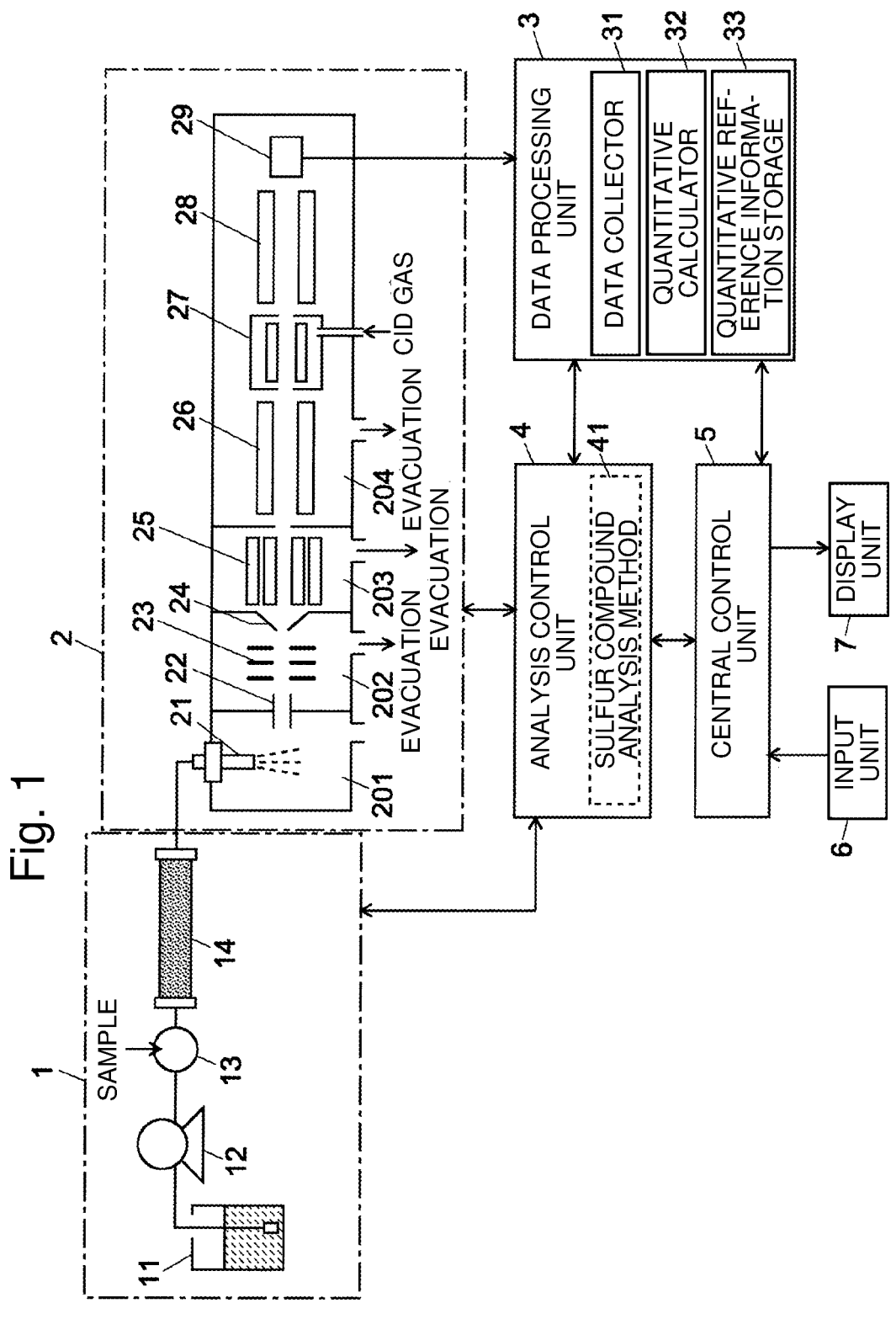
FIG. 1 is a schematic configuration diagram of an example of an analyzing system for carrying out the quantitative determination method for a reactive sulfur according to the present invention.

A quantitative determination method for a reactive sulfur as one embodiment of the present invention is hereinafter described with reference to the attached drawings.

[Sulfur Compounds as Analysis Targets]

The primary objective of the quantitative determination method according to the present embodiment is to determine the quantity of a sulfur compound including a reactive sulfur present in a specimen, such as a sample of human blood (plasma) or a cell sample from an internal organ. However, the type of specimen is not limited to those examples; any type of biological sample may be a specimen.

FIG. 3 shows 17 sulfur compounds which are the targets of the quantitative analysis in the present quantitative determination method.

As shown in the right part of FIG. 3, the 17 sulfur compounds are divided into six groups. Among these groups, four groups are important as reactive sulfurs: the cysteine group, cystine group, reduced glutathione group and oxidized glutathione group. In these four groups, the sulfur compounds marked with asterisks in FIG. 3 are chemically stable sulfur compounds (i.e., they are not reactive sulfurs in the normal, narrow sense), for which standard substances of known concentrations are commonly available. The other sulfur compounds with no asterisk have no standard substances commonly offered. The reactive sulfurs in the cysteine group and the reduced glutathione group have a highly reactive thiol group (—SH), so that they are unstable reactive sulfurs that particularly lack chemical stability.

The two groups other than the four aforementioned groups are the sulfuric acid group and the side-reaction-product group. The sulfur compounds included in the four aforementioned groups are organic compounds, whereas those included in the sulfuric acid group are inorganic compounds, which are sulfuric acids and thiosulfuric acids in the present example. The sulfur compounds included in the side-reaction-product group are not compounds originally contained in the specimen; they are sulfur compounds derived as side products during the pretreatment which will be described later. It should be noted that, in general, the sulfur compounds that can be included in the sulfuric acid group, such as the sulfuric acid and thiosulfuric acid, are not classified as reactive sulfurs. However, those sulfur compounds can be considered as equivalent to reactive sulfurs since those compounds are important sources of sulfur in the metabolism in living organisms.

As can be seen in FIG. 3, in the present example, the plurality of sulfur compounds belonging to the same group in the four aforementioned groups are compounds which are identical in structure (construction) except for the number of sulfur atoms forming the chain combination ( . . . —S—S— . . . ) of the sulfur atoms. For example, the number of sulfur atoms forming the chain combination ranges from one to three in the three sulfur compounds belonging to the cysteine group. Sulfur compounds having four or more sulfur atoms forming this chain combination also exist, which may additionally be included in this group. The same also applies to the other groups. A sulfur compound whose structure exclusive of the chain combination of the sulfur atoms is not perfectly identical to the members of a specific group may still be admissible to this group. As for the side-reaction-product group, a variety of side-reaction products can be produced since the bonding site at which the reaction can take place is not limited to one specific site. Accordingly, the side-reaction-product group can include a plurality of sulfur compounds which are identical in the number of sulfur atoms in the chain combination yet are structurally different from each other.

The sulfur compound for which a standard substance is readily available in each of the four aforementioned groups is a compound in which the number of sulfur atoms forming the chain combination is one or the smallest number in the group (specifically, two). Thus, a sulfur compound in which the number of sulfur atoms forming the chain combination is one or the smallest number among the plurality of sulfur compounds in the group can be chosen as a suitable standard substance, regardless of the number of sulfur compounds included in the group or the common structure of the sulfur compounds in the group.

[Pretreatment for Stabilizing Reactive Sulfur]

The unstable reactive sulfur mentioned earlier is difficult to analyze in its original form. Therefore, a derivatization pretreatment for stabilizing the reactive sulfur is performed. Specifically, β-(4-hydroxyphenyl)ethyl iodoacetamide (HPE-IAM) is used here as the reagent for derivatization.

Figure 4:
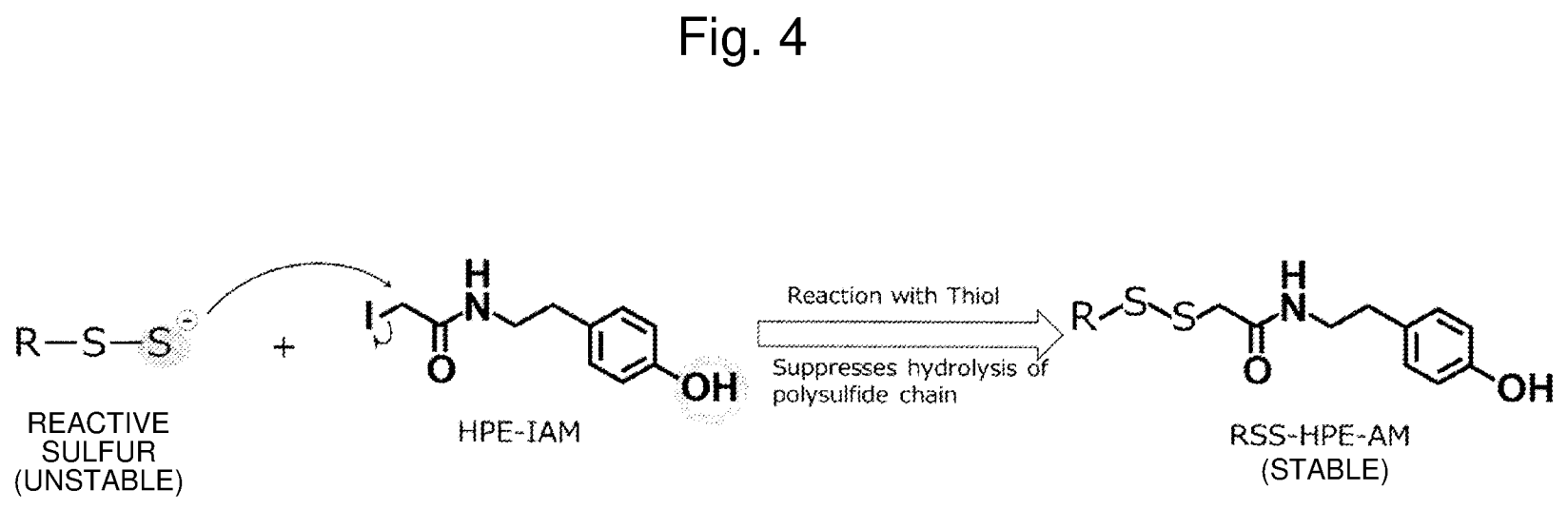

FIG. 4 illustrates the derivatization reaction using the HPE-IAM. This reagent selectively reacts with the SH group in the reduced reactive sulfur and thereby derivatize the reactive sulfur. The OH group in the derivative acts as an inhibitor of the side reaction on the polysulfide chain, making the compound chemically stable. The "-HPE" included in the abbreviated compound names in FIG. 3 as well as FIGS. 5, 6, 8 and 9 (which will be referred to later) indicates that the compound is a derivative obtained with HPE-IAM. This type of derivatization is practically indispensable as a pretreatment for a measurement on a reduced reactive sulfur, although the use of HPE-IAM as the reagent is not essential.

[Principle of Quantitative Determination of Reactive Sulfur]

In the quantitative determination method according to the present embodiment, a liquid chromatograph-triple quadrupole mass spectrometer (LC-MS/MS) is used for an exhaustive measurement of the 17 aforementioned sulfur compounds contained in a specimen. In the LC-MS/MS, the liquid chromatograph in the first stage roughly performs temporal separation of the 17 sulfur compounds and other various foreign substances in a specimen, while the triple quadrupole mass spectrometer in the second stage selectively detects each of the 17 sulfur compounds and acquires an ion intensity signal corresponding to the amount of detected compound.

In the triple quadrupole mass spectrometer, an MRM measurement is performed for each of the 17 sulfur compounds within a predetermined range of measurement time around a retention time corresponding to the sulfur compound, in which a multiple reaction monitoring (MRM) transition consisting of the combination of the mass-to-charge ratios (m/z) of a specific precursor ion and a specific product ion corresponding to the sulfur compound is selected as the target. A set of data constituting an extracted ion chromatogram (which is hereinafter simply called the "chromatogram") is thereby obtained for each of the 17 sulfur compounds. If a sulfur compound is contained in the specimen, a peak appears in the chromatogram corresponding to that sulfur compound. Since the area (or height) of this peak depends on the abundance or concentration of the sulfur compound concerned, it is possible to determine a quantitative value, such as the content or concentration, based on the area value or height value of the peak.

The most common method for determining the quantity of a component in a specimen by means of an LC-MS/MS (or similar device) is an absolute determination method using an external standard in which an unknown concentration is determined from the area value (or the like) of a peak by referring to a calibration curve prepared beforehand using a standard substance of known concentration. However, as noted earlier, it is generally difficult to obtain a standard substance of a reactive sulfur. To address this problem, in the present method, a sulfur compound for which a standard substance is commonly available is used as a reference, and two types of quantitative determination is performed: relative quantitative determination in which the concentration ratio of a plurality of sulfur compounds is determined, and pseudo absolute quantitative determination in which a calibration curve prepared using a standard substance of a single sulfur compound is also referred to for the calculation of the absolute concentrations of reactive sulfurs related to that single sulfur compound.

However, even sulfur compounds in the same group significantly vary in the signal intensity (typically, the peak area value in a chromatogram) obtained for the same concentration. To address this problem, the tuning of the MS analysis condition is considered for each group so that the signal intensities for the plurality of sulfur compounds included in the group will be generally equal.

There are several parameters that influence the signal intensity in the LC-MS/MS. For example, there are normally multiple MRM transitions available for selectively detecting a given compound, and the level of sensitivity changes depending on the used MRM transition. Changing the collision energy in the collision-induced dissociation (CID) process for MS/MS analysis causes a different form of ion dissociation, which changes the signal intensity in a specific MRM transition. In many cases, signal intensities for a plurality of sulfur compounds can be generally equalized by appropriately choosing the MRM transition and properly adjusting the value of the collision energy for each sulfur compound.

However, in the case of equalizing the signal intensities through the tuning of the MRM transition and the collision energy, the detection sensitivity may possibly become significantly low since the signal intensities are equalized to the lowest value among the intensity values obtained for the plurality of sulfur compounds. Accordingly, in the present example, in order to prevent the detection sensitivity from being extremely low, the mass-resolving power for some of the sulfur compounds is lowered to increase their detection sensitivities and thereby equalize signal intensities. The tuning of the mass-resolving power can be achieved by regulating the m/z-value width of the ions which are allowed to pass through the front and rear quadrupole mass filters in the triple quadrupole mass spectrometer.

FIGS. 7A and 7B shows one example of the chromatograms of cysteine and cysteine persulfides (two kinds) before and after the tuning of the MS analysis condition. These are the results of LC/MS/MS measurements of standard substances of the same concentration (for the cysteine persulfides, specially synthesized standard substances were used).

Specifically, FIG. 7A shows chromatograms obtained under an MS analysis condition prepared for each compound so as to maximize the signal intensity, while FIG. 7B shows chromatograms obtained under an MS analysis condition tuned so as to equalize the signal intensities. In the present case, since the difference in signal intensity before the tuning is comparatively small, the signal intensities could be generally equalized by tuning only the collision-energy value.

FIG. 6A shows an example of the signal intensities and the signal intensity ratios before the parameter tuning, and FIG. 6B shows an example of the signal intensities and the signal intensity ratios after the parameter tuning, for all of the 17 sulfur compounds mentioned earlier. As with FIGS. 7A and 7B, these are the results of LC/MS/MS measurements of standard substances of the same concentration (for reactive sulfurs, specially synthesized standard substances were used).

As can be seen in FIG. 6A, the two sulfur compounds abbreviated as CysSSSSCys and HSO3-HPE have particularly low signal intensities in their respective groups. Therefore, the general detection sensitivity would be extremely low if the collision energy (or other related parameters) were adjusted so as to lower the signal intensities of the other sulfur compounds to the levels of those two sulfur compounds. To avoid this situation, the mass-resolving power is tuned (or practically, lowered) for those two sulfur compounds to increase their signal intensities, while the collision-energy value is tuned for the other sulfur compounds to decrease their signal intensities, so as to equalize the signal intensities for the same concentration in each group. Consequently, as shown in the rightmost column of FIG. 6B, the signal intensities after the tuning were within a range from 20% to 60% of the highest signal intensity before the tuning; a significant decrease in detection sensitivity was thus avoided. The variation in signal intensity within each group did not exceed 10%.

It should be noted that the results shown in FIGS. 6A and 6B were obtained by measurements of standard substances with no foreign substances. For a real specimen, it is necessary to evaluate influences of various foreign substances which are present in addition to the sulfur compounds. Accordingly, a spike and recovery test, using real samples of blood plasma and cells, was conducted for each sulfur compound under the parameters tuned as shown in FIG. 6B, and the recovery rate was determined. FIGS. 8 and 9 show the test results. In both cases of blood plasma and cells, it was confirmed that the relative-intensity variation could be confined within a range of approximately ±20% for almost all sulfur compounds by appropriately diluting the samples.

As described to this point, as far as the 17 aforementioned sulfur compounds are concerned, it is possible to generally equalize signal intensities for a plurality of sulfur compounds in the same group by appropriately selecting the MRM transition as well as appropriately tuning the collision-energy value and the mass-resolving power. In other words, it is possible to bring the signal intensities of a plurality of sulfur compounds in the same group into a predetermined relationship when the concentrations of the plurality of sulfur compounds are equal. Since this relationship holds true for any concentration value, the relative quantitative determination of a plurality of sulfur compounds included in the same group can be accurately performed with a wide dynamic range for each group. When a measurement result for a standard substance of a sulfur compound that is chemically stable and readily available has been obtained for each group, it is possible to acquire, from that result, quantitative reference information for the absolute determination of all sulfur compounds in that group.

In the quantitative determination method according to the present embodiment, a manufacturer who provides a system or method file for carrying out the quantitative determination previously performs an investigation using standard substances of the 17 sulfur compounds to determine, for each sulfur compound, the MRM transition, collision-energy value and mass-resolving power so that the sulfur compounds in the same group will produce almost equal signal intensities when they are contained at the same concentration. Based on the investigation result, the manufacturer determines analysis conditions (LC and MS analysis conditions) including an individual MS analysis condition for each sulfur compound and prepares a method file for carrying out LC/MS/MS analyses under those analysis conditions.

[Configuration Example of Analyzing System]

An example of the analyzing system to be used for a measurement is hereinafter described. FIG. 1 is a schematic configuration diagram of one example of the analyzing system. The present analyzing system is an LC-MS/MS system including a measurement unit, which includes a liquid chromatograph (LC) 1 and a mass spectrometer 2, as well as a data processing unit 3, analysis control unit 4, central control unit 5, input unit 6 and display unit 7.

The liquid chromatograph 1 includes a mobile phase container 11 in which a mobile phase (solvent) is stored, a liquid-sending pump 12 for suctioning and supplying the mobile phase from the mobile phase container 11, an injector 13 for injecting a sample into the mobile phase, and a column 14 for separating a plurality of components in the sample in the temporal direction. Though not shown, an autosampler is normally connected to the injector 13 so as to sequentially analyze a number of specimens.

The mass spectrometer 2 is a triple quadrupole mass spectrometer including an ionization chamber 201 maintained at substantially atmospheric pressure, as well as a first intermediate vacuum chamber 202, second intermediate vacuum chamber 203 and high vacuum chamber 204 which are individually evacuated with vacuum pumps (not shown). The ionization chamber 201 is equipped with an ESI spray 21 configured to perform ionization by an electrospray ionization (ESI) method. The ionization chamber 201 is connected to the first intermediate vacuum chamber 202 in the next stage by a desolvation tube 22. The first intermediate vacuum chamber 202 contains an ion guide 23 configured to transport ions while converging them. The first intermediate vacuum chamber 202 communicates with the second intermediate vacuum chamber 203 in the next stage through a small hole formed at the apex of a skimmer 24. The second intermediate vacuum chamber 203 also contains a multipole ion guide 25 configured to transport ions while converging them.

Within the high vacuum chamber 204, a front quadrupole mass filter 26, collision cell 27, rear quadrupole mass filter 28 and ion detector 29 are arranged along the flow of ions. The collision cell 27 contains a quadrupole ion guide. Each of the front and rear quadrupole mass filters 26 and 28 has the function of selectively allowing an ion having a specific m/z to pass through. A collision-induced dissociation (CID) gas, which is argon or similar inert gas, can be introduced from an external source into the collision cell 27, thereby giving the collision cell 27 the function of making an introduced ion come in contact with the CID gas and be dissociated into product ions.

The data processing unit 3 is configured to receive detection data from the ion detector 29 and perform computational processing based on the data. It includes a data collector 31, quantitative calculator 32, and quantitative reference information storage section 33 as its functional blocks. The analysis control unit 4 is configured to control the operations of the liquid chromatograph 1 and the mass spectrometer 2 according to a sulfur compound analysis method ("method file") 41, which contains information specifying special analysis conditions prepared for the quantitative determination of sulfur metabolites and stored in an internal storage. The central control unit 5 is configured to mainly perform an overall control of the related sections as well as a user interface through the input unit 6, display unit 7 and other related sections. The sulfur compound analysis method 41 contains an individual MS analysis condition for each sulfur compound, as described earlier.

In normal cases, the actual form of the data processing unit 3, analysis control unit 4 and central control unit 5 is a personal computer, or a more sophisticated computer called a "workstation", with the functions of the aforementioned functional blocks realized by running, on this computer, a piece of dedicated software (computer program) previously installed on the same computer. Accordingly, the sulfur compound analysis method 41 is also a kind of program which provides parameters for the analysis and a procedure for the data processing.

[Schematic Description of Measurement Operation]

In the previously described analyzing system, an MRM measurement for a specific MRM transition is repeatedly performed over a predetermined measurement period in the measurement unit during an analysis of a sulfur compound. A measurement operation, including this MRM measurement, is hereinafter schematically described.

In the liquid chromatograph 1, the liquid-sending pump 12 suctions the mobile phase from the mobile phase container 11 and sends it to the injector 13 at a substantially constant flow velocity. The injector 13 injects a predetermined amount of sample (specimen) into the mobile phase at a predetermined timing. The sample is carried by the mobile phase and introduced into the column 14. While passing through the column 14, the various components in the sample are eluted in a temporally separated form. After exiting the column 14, the eluate arrives at the ESI spray 21 in the mass spectrometer 2. At this ESI spray 21, the sample is sprayed into the ionization chamber 201 in the form of electrically charged droplets. The charged droplets are divided into smaller particles by coming in contact with the residual gas molecules, causing the solvent in the droplets to be vaporized. Through this process, the compound molecules in the sample are ionized.

The generated ions are sent through the desolvation tube 22 into the first intermediate vacuum chamber 202, and are further transported through the ion guide 23, the small hole of the skimmer 24, and the multipole ion guide 25 to the high vacuum chamber 204. The ions originating from the sample components are introduced into the front quadrupole mass filter 26. Only an ion having a specific m/z corresponding to the voltages applied to the electrodes constituting the front quadrupole mass filter 26 is selectively allowed to pass through this filter as a precursor ion. The precursor ion enters the collision cell 27 and undergoes dissociation by coming in contact with the CID gas, whereby various product ions are produced.

The various product ions thus generated are introduced into the rear quadrupole mass filter 28. Only a product ion having a specific m/z corresponding to the voltages applied to the electrodes constituting the rear quadrupole mass filter 28 is selectively allowed to pass through this filter and reach the ion detector 29. The ion detector 29 produces a detection signal corresponding to the amount of incident ions. An analogue-to-digital converter (not shown) converts this signal into digitized detection data, which is sent to the data processing unit 3.

The analysis control unit 4 controls the mass spectrometer 2 so that appropriate voltages corresponding to the target MRM transition are applied to the electrodes of the front quadrupole mass filter 26 and those of the rear quadrupole mass filter 28. The same unit also sets the direct voltages applied to ion transport optical systems (not shown) and other related elements so that an ion which has passed through the front quadrupole mass filter 26 possesses a predetermined amount of collision energy when entering the collision cell 27. Consequently, a piece of detection data is obtained which shows the ion intensity of an ion corresponding to a specific MRM transition, i.e., a product ion having a specific m/z resulting from the dissociation a precursor ion having a specific m/z, selected from the ions originating from the various components contained in the sample.

In the mass spectrometer 2, the form of the dissociation which the precursor ion undergoes through the CID process within the collision cell 27 changes depending on the amount of kinetic energy, i.e., the collision energy, which the precursor ion possesses. The collision energy is determined by the DC potential difference between the entrance end of the collision cell 27 and the previous element (which is the front quadrupole mass filter 26 in the case of FIG. 1, although it may be a different type of ion optical element, such as an ion lens). Therefore, the collision energy is normally indicated by that potential difference. Accordingly, it is possible to adjust the collision energy through a DC bias voltage applied to either the front quadrupole mass filter 26 or the previous ion optical element, or DC bias voltages applied to both elements.

[Procedure for Quantitative Analysis of Sulfur Compounds]

FIG. 2 is a flowchart showing one example of a schematic procedure for a quantitative analysis of sulfur compounds. The following description is an example in which the quantities of all of the 17 sulfur compounds shown in FIG. 3 are determined. It is not essential to determine the quantities of all compounds; it may be sufficient to determine the quantity of one reactive sulfur included in at least one group.

A user who is going to perform a quantitative analysis initially prepares a standard substance having a known concentration of a chemically stable sulfur compound ("base compound") for which a standard substance is available in each of the group shown in FIG. 3. For each standard substance, a measurement using the analyzing system shown in FIG. 1 is performed according to the sulfur compound analysis method 41 (Step S1). Specifically, the standard substance of the base compound to be subjected to this measurement is cysteine for the cysteine group, cystine for the cystine group, reduced glutathione for the reduced glutathione group, oxidized glutathione for the oxidized glutathione group, and either sulfuric acid or thiosulfuric acid for the sulfuric acid group. No measurement of the standard substance is performed for the side-reaction-product group since there is generally no standard substance commonly available for this group.

An example of the important LC and MS analysis conditions for the measurement of the 17 sulfur compounds is as follows. It should be noted that the present example assumes that LCMS-8060NX, manufactured by Shimadzu Corporation, is used as the measurement unit. The MRM transitions for the sulfur compounds are as described in FIGS. 8 and 9.

<LC Analysis Conditions>

Type of column: PFPP column

Gradient condition: gradient elution using mobile phase A (formate—water) and mobile phase B (formate—methanol)

Flow velocity of mobile phase: 0.3 mL/min

Amount of sample injection: 2 μL

Column temperature: 40 degrees Celsius

<MS Analysis Conditions>

Flow rate of nebulizer gas: 3.0 L/min

Flow rate of drying gas: 10.0 L/min

Flow rate of heating gas: 10.0 L/min

Temperature of desolvation tube: 250 degrees Celsius

Temperature of heat block (inside the ionization chamber): 400 degrees Celsius

Ionization mode: IonFocus ESI

Figure 5:
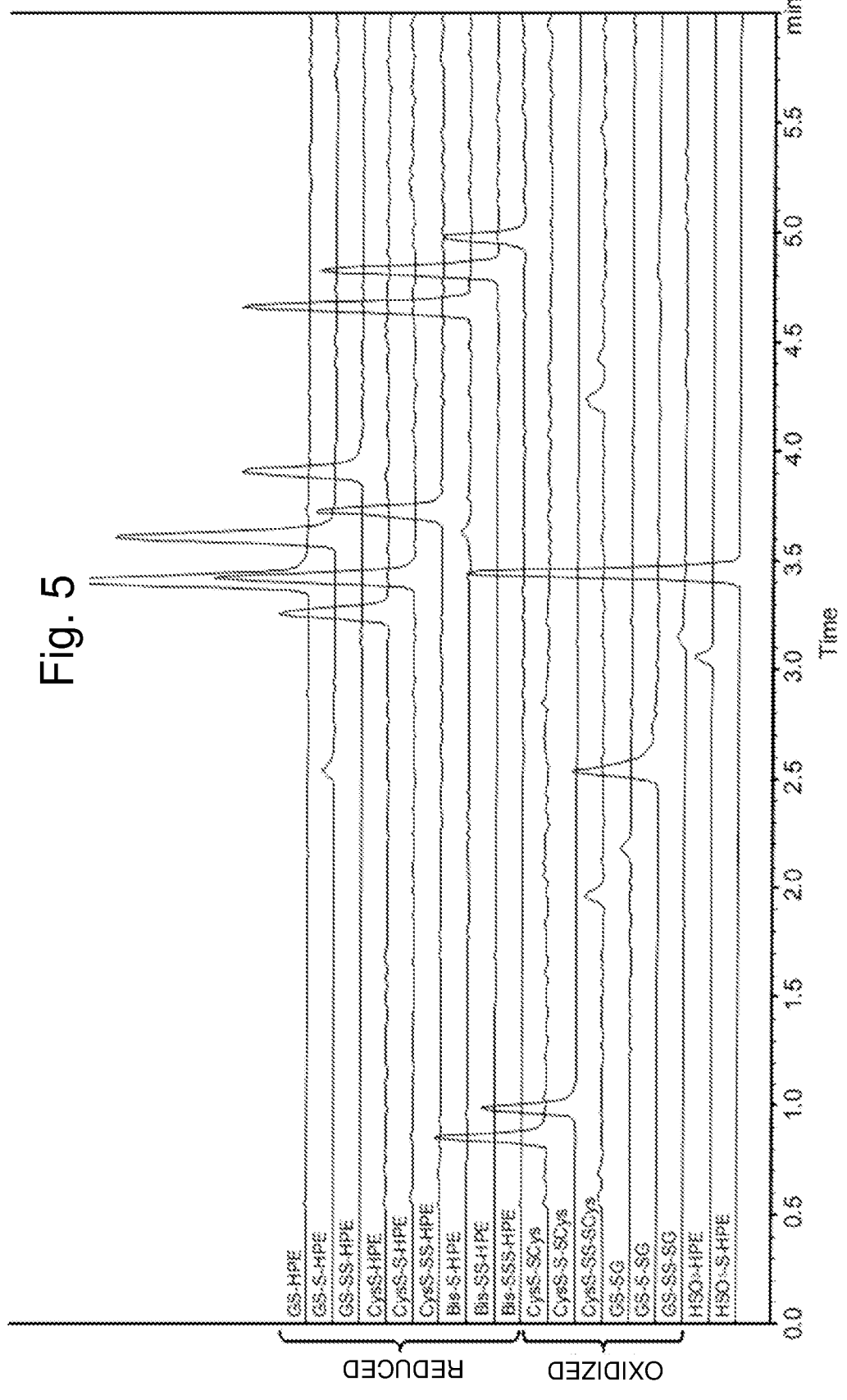
FIG. 5 shows an example of actually measured chromatograms of the 17 sulfur compounds in a specimen.

The 17 aforementioned sulfur compounds can be roughly separated from each other in the temporal direction under the previously described LC analysis conditions. FIG. 5 shows one example of the chromatograms obtained by a measurement of a real specimen using an LC-MS/MS under the previously described conditions. Although some of the sulfur compounds in FIG. 5 temporally overlap each other, those overlapping compound can be separated by MRM measurements.

The measurement for the base compound is carried out for each group, using the previously described analyzing system. A set of chromatogram data obtained by repeating the MRM measurement is stored for each group in the data collector 31. The quantitative calculator 32 subsequently analyzes the chromatogram data to detect a peak corresponding to each base compound, calculates the area value of that peak, and acquires quantitative reference information showing the relationship between the known concentration and the area value for each group (Step S2). The obtained quantitative reference information is stored in the quantitative reference information storage section 33.

For example, the quantitative reference information may be a calibration curve mathematically representing the relationship between the concentration and the area value. For the preparation of a calibration curve, a plurality of standard-substance samples of different levels of concentrations should preferably be used. Another possible form of the quantitative reference information is the combination of one concentration value and one area value. Although the quantitative reference information is originally prepared for the base compound, this quantitative reference information will also be used as the quantitative reference information for reactive sulfurs since the parameters will be tuned so that the base compound and the reactive sulfurs in the same group will have generally equal signal intensities for the same concentration.

Subsequently, the user performs the derivatization pretreatment for reduced reactive sulfurs in the target specimen in the previously described manner to stabilize the reactive sulfurs (Step S3). The user subsequently sets the pretreated specimen in the measurement unit and enters a command from the input unit 6 to initiate the measurement. Upon receiving this command, the analysis control unit 4 conducts the LC/MS/MS analysis on the specimen according to the sulfur compound analysis method (Step S4). The analysis conditions used in this step are identical to those used in the measurement for the standard substance in Step S1.

The chromatogram data obtained in this measurement are temporarily stored in the data collector 31. In the mass spectrometer 2, an MRM measurement is performed for each sulfur compound in the specimen according to the previously described MS analysis conditions and the tuned parameters. Therefore, for example, if the cysteine (CysS-HPE) and the cysteine persulfide (CysSS-HPE) are contained at equal concentrations in the specimen, the peaks on the chromatograms corresponding to these sulfur compounds will also have approximately equal area values.

The quantitative calculator 32 analyzes the chromatogram data and calculates the area value of the peak corresponding to each sulfur compound. Subsequently, for each group, the quantitative calculator 32 calculates the quantitative values of the plurality of sulfur compounds included in the group, i.e., either the concentration values as absolute quantitative values or concentration ratios as relative quantitative values, based on the area values of those sulfur compounds and the quantitative reference information of the group in question read from the quantitative reference information storage section 33 (Step S5). The quantitative values thus determined are shown on the display unit 7.

For example, in the case of the relative quantitative determination of a plurality of sulfur compounds included in the cysteine group, the area value of the cysteine of a specified concentration is obtained as the quantitative reference information. Accordingly, the concentration value of the cysteine in the specimen is determined from the area value of the cysteine in the specimen and the quantitative reference information, while the relative concentration, or the relative quantitative value, of the cysteine persulfide is determined from the area value of the cysteine persulfide in the specimen and the quantitative reference information. In the case of the absolute quantitative determination of a plurality of sulfur compounds included in the cysteine group, a calibration curve showing the relationship between the concentration and area value of cysteine is obtained as the quantitative reference information. Accordingly, the absolute concentration value of the cysteine in the specimen is determined from the area value of the cysteine in the specimen and the quantitative reference information, while an approximate value of the absolute concentration of the cysteine persulfide in the specimen is determined from the area value of the cysteine persulfide in the specimen and the quantitative reference information. The quantitative values of the sulfur compounds in other groups are also similarly determined. As for the side-reaction-product group, for which there is no quantitative reference information based on a measurement result of a standard substance, the relative quantitative determination can be performed based on the ratio of the area values of the sulfur compounds since the plurality of sulfur compounds included in the group should have almost equal area values when their concentrations are the same.

As described thus far, the quantitative determination method according to the present embodiment enables effortless determination on reactive sulfurs for which it is generally difficult to obtain standard substances.

Modified Example

The numerical values shown in the aforementioned analysis conditions and other sections are mere examples. It is naturally possible that those values can change depending on the model of the used apparatus as well as other factors.

It should also be naturally understood that the system and procedure used in the previous descriptions are mere examples and are not limited to the described examples.

The quantitative determination in the previously described embodiment is essentially targeted at reactive sulfurs included in the four groups of cysteine, cystine, reduced glutathione and oxidized glutathione. It is naturally possible to apply a similar method in the quantitative determination of other types of reactive sulfurs. For example, mercaptopyruvic acid and coenzyme A are reduced reactive sulfurs having a thiol group. Similar to cysteine, they have a plurality of sulfur compounds in which the chain combination of one or more sulfur atoms is present between the thiol group and the other portions of the structure. Another example is cystathionine, a type of oxidized reactive sulfur similar to cystine. Cystathionine includes the same partial structures connected by the chain combination of sulfur atoms and has a plurality of sulfur compounds with different numbers of sulfur atoms in the chain combination.

These types of sulfur compounds also allow for the creation of a group of a plurality of sulfur compounds which are substantially identical in structure except for the chain combination of sulfur atoms and are different in the number of sulfur atoms forming the chain combination, and in this group, a compound in which the number of sulfur atoms forming the chain combination is one or the smallest number among the sulfur compounds in the group can be used as a standard substance for the quantitative determination of the plurality of sulfur compounds in the group.

[Various Modes]

It is evident for a person skilled in the art that the previously described illustrative embodiment is a specific example of the following modes of the present invention.

(Clause 1) One mode of the quantitative determination method for a reactive sulfur according to the present invention is a method for determining the quantity of a sulfur compound including a reactive sulfur in a specimen by means of a chromatograph mass spectrometer, where the sulfur compound is included in at least one group as an analysis target selected from groups comprised of a group including cystine and reactive sulfurs related to cystine, a group including cysteine and reactive sulfurs related to cysteine, a group including oxidized glutathione and reactive sulfurs related to oxidized glutathione, and a group including reduced glutathione and reactive sulfurs related to reduced glutathione, the method including:

a standard substance measurement step for performing a measurement by a chromatograph mass spectrometer, for a standard substance having a known concentration of a base compound which is cystine, cysteine, oxidized glutathione or reduced glutathione included in the group as the analysis target;

a quantitative reference information acquisition step for acquiring quantitative reference information used for determining the quantities of the base compound and other reactive sulfurs included in the group as the analysis target, based on a measurement result obtained by the standard substance measurement step, on the assumption that signal intensities of a plurality of sulfur compounds included in the same group show a predetermined relationship when the concentrations of the plurality of sulfur compounds are equal;

a specimen measurement step for performing a measurement of a specimen by a chromatograph mass spectrometer for each sulfur compound included in the group as the analysis target, where the measurement is performed under an analysis condition determined beforehand for each sulfur compound so that signal intensities of a plurality of sulfur compounds included in the same group show the predetermined relationship when the concentrations of the plurality of sulfur compounds are equal; and a quantitative determination step for determining the quantity of each sulfur compound included in the group as the analysis target, using a measurement result obtained by the specimen measurement step and the quantitative reference information.

By the quantitative determination method for a reactive sulfur according to Clause 1, a standard substance of a chemically stable sulfur compound which is generally and readily available can be used to conveniently perform sufficiently accurate quantitative determination of various sulfur compounds including a reactive sulfur which is chemically so unstable that a standard substance is difficult to obtain. The "reactive sulfurs related to" a specific type of sulfur compound, such as cystine, typically mean a group of sulfur compounds which are identical in structure except for the number of sulfur atoms in the chain combination of sulfur atoms (an integer equal to or larger than one). It should be noted that, as far as the plurality of sulfur compounds included in the same group is concerned, the "structure except for the number of sulfur atoms" only needs to be substantially identical and does not always need to be exactly the same.

Reactive sulfurs in the cysteine group and reduced glutathione group are particularly unstable. Therefore, for these groups, it is preferable to perform a pretreatment for stabilization using a reagent that selectively reacts with the thiol group (typically, the HPE-IAM mentioned earlier) before the measurement.

(Clause 2) In the quantitative determination method for a reactive sulfur according to Clause 1, the quantitative determination step may include determining the concentration ratio of a plurality of sulfur compounds included in each group.

By the quantitative determination method for a reactive sulfur according to Clause 2, relative quantitative determination of the sulfur compounds included in the same group can be performed for each group. Although sulfur compounds contained in a specimen may possibly have a significant variation in concentration even when those compounds belong to the same group, the present method is unlikely to cause signal saturation of high-concentration components or omission of low-concentration components in the detection, since the measurement of a specimen is performed under an analysis condition determined beforehand for each sulfur compound, for example, in such a manner that the ratio of the measurement results of a plurality of sulfur compounds in the same group will be included within a predetermined permissible range when the concentrations of the plurality of sulfur compounds are equal. Accordingly, the relative quantities of the components can be determined with a wide dynamic range.

(Clause 3) In the quantitative determination method for a reactive sulfur according to Clause 1, the quantitative reference information acquisition step may include determining a calibration curve which shows a relationship between concentration and signal intensity as the quantitative reference information, and the quantitative determination step may include performing absolute quantitative determination by an external standard method using the quantitative reference information.

In the quantitative determination method for a reactive sulfur according to Clause 3, for example, the absolute concentration value of cysteine persulfide for which a standard substance is difficult to obtain can be approximately determined by a pseudo external standard method using a standard substance which is readily available, such as cysteine.

(Clause 4) In the quantitative determination method for a reactive sulfur according to Clause 1, the chromatograph mass spectrometer may be a liquid chromatograph-triple mass spectrometer, and the analysis condition to be tuned for each sulfur compound in the specimen measurement step may include multiple reaction monitoring (MRM) transition, collision energy and mass-resolving power.

The collision energy can be tuned through the DC voltage applied to the entrance of the collision cell in the triple quadrupole mass spectrometer as well as the voltage applied to an ion transport optical system (including the front quadrupole mass filter) located before the collision cell. The mass-resolving power, which is determined by the m/z widths within which ions are allowed to pass through the two (front and rear) quadrupole mass filters in the triple quadrupole mass spectrometer, can be tuned through the voltages applied to the electrodes forming those quadrupole mass filters.

The quantitative determination method for a reactive sulfur according to Clause 4 allows for the tuning of not only the MRM transition and the collision energy, both of which have significant influences on the signal intensity of ions, but also the mass-resolving power as needed. By tuning the three parameters, it is possible to obtain generally equal signal intensities for a plurality of sulfur compounds included in one group even when those sulfur compounds significantly vary in signal intensity for the same component concentration under the same analysis condition. This enables satisfactory determination of the quantities of the reactive sulfurs included in the four aforementioned groups.

(Clause 5) Another mode of the quantitative determination method for a reactive sulfur according to the present invention is a method for determining the quantities of a plurality of sulfur compounds each of which includes a reactive sulfur in a specimen by means of a chromatograph mass spectrometer, where the plurality of sulfur compounds are included in at least one group as an analysis target selected from groups comprised of a group including cystine and reactive sulfurs related to cystine, a group including cysteine and reactive sulfurs related to cysteine, a group including oxidized glutathione and reactive sulfurs related to oxidized glutathione, a group including reduced glutathione and reactive sulfurs related to reduced glutathione, a group including sulfuric acid and inorganic sulfur compounds related to sulfuric acid, and a group including side-reaction products generated from sulfuric compounds by a derivatization treatment for stabilizing a reactive sulfur, the method including:

a pretreatment step for performing, on a specimen, the derivatization treatment for stabilizing a reactive sulfur by using a predetermined derivatization reagent;

a specimen measurement step for performing a measurement of a specimen by a chromatograph mass spectrometer for each sulfur compound included in the group as the analysis target after the pretreatment of the specimen by the pretreatment step, where the measurement is performed under an analysis condition determined beforehand for each sulfur compound so that signal intensities of a plurality of sulfur compounds included in the same group show a predetermined relationship when the concentrations of the plurality of sulfur compounds are equal; and a quantitative determination step for performing relative quantitative determination of the plurality of sulfur compounds included in the group as the analysis target, based on a measurement result obtained by the specimen measurement step.

(Clause 6) In the quantitative determination method for a reactive sulfur according to Clause 5, the analysis condition determined beforehand for each sulfur compound may be determined so that the signal intensities of the plurality of sulfur compounds become substantially equal to each other.

In the quantitative determination method for a reactive sulfur according to Clause 6, when a plurality of sulfur compounds included in the same group are contained at equal concentrations in a specimen, the signal intensities of those sulfur compounds will be substantially equal. Accordingly, the signal intensity ratio of a plurality of sulfur compounds represents their relative concentration ratio, so that relative quantitative determination is possible. In the case where the signal intensities of a plurality of sulfur compounds included in the same group and contained at equal concentrations are not equal to each other yet show a known specific relationship (ratio), it is evidently possible to calculate the relative concentration ratio of those compounds by using that known specific relationship.

Thus, by the quantitative determination method for a reactive sulfur according to Clauses 5 and 6, the relative quantitative determination of a plurality of sulfur compounds can be accurately performed with a wide dynamic range within each group without requiring a measurement for a standard substance of a sulfur compound.

(Clause 7) Another mode of the quantitative determination method for a reactive sulfur according to the present invention is a method for determining the quantity of a sulfur compound including a reactive sulfur in a specimen by means of a chromatograph mass spectrometer, the method including:

a standard substance measurement step for performing a measurement by a chromatograph mass spectrometer, for a standard substance having a known concentration of a sulfur compound included in a plurality of sulfur compounds forming one group which includes a target sulfur compound whose quantity is to be determined, where the plurality of sulfur compounds forming one group are identical in structure except for a chain combination of sulfur atoms and are different in the number of sulfur atoms forming the chain combination, and where the number of sulfur atoms forming the chain combination in the sulfur compound concerned is one or the smallest number in the group;

a quantitative reference information acquisition step for acquiring quantitative reference information used for determining the quantities of the sulfur compounds included in the same group, based on a measurement result obtained by the standard substance measurement step, on the assumption that signal intensities of a plurality of sulfur compounds included in the same group show a predetermined relationship when the concentrations of the plurality of sulfur compounds are equal;

a specimen measurement step for performing a measurement for the target sulfur compound in a specimen by a chromatograph mass spectrometer, where the measurement is performed under an analysis condition determined beforehand for each sulfur compound so that signal intensities of a plurality of sulfur compounds included in the same group show the predetermined relationship when the concentrations of the plurality of sulfur compounds are equal; and a quantitative determination step for determining the quantity of the target sulfur compound, using a measurement result obtained by the specimen measurement step and the quantitative reference information.

By the quantitative determination method for a reactive sulfur according to Clause 7, the quantitative determination of not only the previously mentioned sulfur compounds related to cystine, cysteine, oxidized glutathione and reduced glutathione, but also sulfur compounds including a wider variety of reactive sulfurs, can be conveniently performed with a sufficient level of accuracy by using a standard substance of a chemically stable sulfur compound which is generally and readily available.

REFERENCE SIGNS LIST

1 . . . Liquid Chromatograph
11 . . . Mobile Phase Container

12 . . . Liquid-Sending Pump
13 . . . Injector
14 . . . Column
2 . . . Mass Spectrometer
201 . . . Ionization Chamber
202 . . . First Intermediate Vacuum Chamber
203 . . . Second Intermediate Vacuum Chamber
204 . . . High Vacuum Chamber
21 . . . ESI Spray
22 . . . Desolvation Tube
23 . . . Ion Guide
24 . . . Skimmer
25 . . . Multipole Ion Guide
26 . . . Front Quadrupole Mass Filter
27 . . . Collision Cell
28 . . . Rear Quadrupole Mass Filter
29 . . . Ion Detector
3 . . . Data Processing Unit
31 . . . Data Collector
32 . . . Quantitative Calculator
33 . . . Quantitative Reference Information Storage Section
4 . . . Analysis Control Unit
41 . . . Sulfur Compound Analysis Method
5 . . . Central Control Unit
6 . . . Input Unit
7 . . . Display Unit

The invention claimed is:

1. A quantitative determination method for a reactive sulfur, which is a method for determining a quantity of a sulfur compound including a reactive sulfur in a specimen by means of a chromatograph mass spectrometer, where the sulfur compound is included in at least one group as an analysis target selected from groups comprised of a group including cystine and reactive sulfurs related to cystine, a group including cysteine and reactive sulfurs related to cysteine, a group including oxidized glutathione and reactive sulfurs related to oxidized glutathione, and a group including reduced glutathione and reactive sulfurs related to reduced glutathione, the method comprising:

a standard substance measurement step for performing a measurement by a chromatograph mass spectrometer, for a standard substance having a known concentration of a base compound which is cystine, cysteine, oxidized glutathione or reduced glutathione included in the group as the analysis target;

a quantitative reference information acquisition step for acquiring quantitative reference information used for determining quantities of the base compound and other reactive sulfurs included in the group as the analysis target, based on a measurement result obtained by the standard substance measurement step, on an assumption that signal intensities of a plurality of sulfur compounds included in the same group show a predetermined relationship when concentrations of the plurality of sulfur compounds are equal;

a specimen measurement step for performing a measurement of a specimen by a chromatograph mass spectrometer for each sulfur compound included in the group as the analysis target, where the measurement is performed under an analysis condition determined beforehand for each sulfur compound so that signal intensities of a plurality of sulfur compounds included in the same group show the predetermined relationship when the concentrations of the plurality of sulfur compounds are equal; and a quantitative determination step for determining the quantity of each sulfur compound included in the group as the analysis target, using a measurement result obtained by the specimen measurement step and the quantitative reference information.

2. The quantitative determination method for a reactive sulfur according to claim 1, wherein the quantitative determination step comprises determining a concentration ratio of a plurality of sulfur compounds included in each group.

3. The quantitative determination method for a reactive sulfur according to claim 1, wherein the quantitative reference information acquisition step comprises determining a calibration curve which shows a relationship between concentration and signal intensity as the quantitative reference information, and the quantitative determination step comprises performing absolute quantitative determination by an external standard method using the quantitative reference information.

4. The quantitative determination method for a reactive sulfur according to claim 1, wherein the chromatograph mass spectrometer is a liquid chromatograph-triple mass spectrometer, and the analysis condition to be tuned for each sulfur compound in the specimen measurement step includes multiple reaction monitoring transition, collision energy and mass-resolving power.

5. A quantitative determination method for a reactive sulfur, which is a method for determining quantities of a plurality of sulfur compounds each of which includes a reactive sulfur in a specimen by means of a chromatograph mass spectrometer, where the plurality of sulfur compounds are included in at least one group as an analysis target selected from groups comprised of a group including cystine and reactive sulfurs related to cystine, a group including cysteine and reactive sulfurs related to cysteine, a group including oxidized glutathione and reactive sulfurs related to oxidized glutathione, a group including reduced glutathione and reactive sulfurs related to reduced glutathione, a group including sulfuric acid and inorganic sulfur compounds related to sulfuric acid, and a group including side-reaction products generated from sulfuric compounds by a derivatization treatment for stabilizing a reactive sulfur, the method comprising:

a pretreatment step for performing, on a specimen, the derivatization treatment for stabilizing a reactive sulfur by using a predetermined derivatization reagent;

a specimen measurement step for performing a measurement of a specimen by a chromatograph mass spectrometer for each sulfur compound included in the group as the analysis target after a pretreatment of the specimen by the pretreatment step, where the measurement is performed under an analysis condition determined beforehand for each sulfur compound so that signal intensities of a plurality of sulfur compounds included in the same group show a predetermined relationship when concentrations of the plurality of sulfur compounds are equal; and a quantitative determination step for performing relative quantitative determination of the plurality of sulfur compounds included in the group as the analysis target, based on a measurement result obtained by the specimen measurement step.

6. The quantitative determination method for a reactive sulfur according to claim 5, wherein the analysis condition determined beforehand for each sulfur compound is determined so that the signal intensities of the plurality of sulfur compounds become substantially equal to each other.

7. A quantitative determination method for a reactive sulfur, which is a method for determining a quantity of a sulfur compound including a reactive sulfur in a specimen by means of a chromatograph mass spectrometer, the method comprising:

a standard substance measurement step for performing a measurement by a chromatograph mass spectrometer, for a standard substance having a known concentration of a sulfur compound included in a plurality of sulfur compounds forming one group which includes a target sulfur compound whose quantity is to be determined, where the plurality of sulfur compounds forming one group are identical in structure except for a chain combination of sulfur atoms and are different in a number of sulfur atoms forming the chain combination, and where the number of sulfur atoms forming the chain combination in the sulfur compound concerned is one or the smallest number in the group;

a quantitative reference information acquisition step for acquiring quantitative reference information used for determining quantities of the sulfur compounds included in the same group, based on a measurement result obtained by the standard substance measurement step, on an assumption that signal intensities of a plurality of sulfur compounds included in the same group show a predetermined relationship when concentrations of the plurality of sulfur compounds are equal;

a specimen measurement step for performing a measurement for the target sulfur compound in a specimen by a chromatograph mass spectrometer, where the measurement is performed under an analysis condition determined beforehand for each sulfur compound so that signal intensities of a plurality of sulfur compounds included in the same group show the predetermined relationship when the concentrations of the plurality of sulfur compounds are equal; and a quantitative determination step for determining the quantity of the target sulfur compound, using a measurement result obtained by the specimen measurement step and the quantitative reference information.

* * * * *